(12) United States Patent
Choi et al.

(10) Patent No.: US 12,535,186 B2
(45) Date of Patent: Jan. 27, 2026

(54) LIQUEFIED GAS STORAGE TANK AND SHIP INCLUDING SAME

(71) Applicant: HYUNDAI HEAVY INDUSTRIES CO., LTD., Ulsan (KR)

(72) Inventors: Byung Ki Choi, Ulsan (KR); Hong Il Im, Ulsan (KR); Hoon Kyu Oh, Ulsan (KR); Yong Tai Kim, Ulsan (KR); Cheon Jin Park, Ulsan (KR); Won Seok Heo, Ulsan (KR); Min Kyu Park, Ulsan (KR); Dong Woo Kim, Ulsan (KR); Sang Ok Lee, Ulsan (KR); Seong Bo Park, Ulsan (KR); Jae Hyeok Ahn, Ulsan (KR); Young Moo Son, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 499 days.

(21) Appl. No.: 17/928,896

(22) PCT Filed: Jul. 1, 2021

(86) PCT No.: PCT/KR2021/008383
§ 371 (c)(1),
(2) Date: Nov. 30, 2022

(87) PCT Pub. No.: WO2022/005235
PCT Pub. Date: Jan. 6, 2022

(65) Prior Publication Data
US 2023/0288030 A1    Sep. 14, 2023

(30) Foreign Application Priority Data
Jul. 3, 2020    (KR) ........................ 10-2020-0082330

(51) Int. Cl.
| | | |
|---|---|---|
| *F17C 13/00* | (2006.01) | |
| *B63B 25/16* | (2006.01) | |
| *B63B 27/24* | (2006.01) | |

(52) U.S. Cl.
CPC ............ *F17C 13/004* (2013.01); *B63B 27/24* (2013.01); *B63B 25/16* (2013.01); *F17C 2223/0153* (2013.01); *F17C 2270/0105* (2013.01)

(58) Field of Classification Search
CPC ............ F17C 13/004; F17C 2223/0153; F17C 2270/0105; B63B 27/24; B63B 25/16
See application file for complete search history.

(56) References Cited

U.S. PATENT DOCUMENTS

| | | | |
|---|---|---|---|
| 3,908,574 A | * | 9/1975 | Miller ..................... B63B 25/16 248/901 |
| 4,013,030 A | | 3/1977 | Stafford |
| 2017/0219166 A1 | | 8/2017 | Jin et al. |

FOREIGN PATENT DOCUMENTS

| | | |
|---|---|---|
| CN | 102159451 A | 8/2011 |
| CN | 110439034 A | 11/2019 |

(Continued)

OTHER PUBLICATIONS

Notice of Allowance was issued in Japanese Patent Application No. 2022-573743 on Mar. 5, 2024.

(Continued)

*Primary Examiner* — Stephen P Avila
(74) *Attorney, Agent, or Firm* — IP & T GROUP LLP

(57) ABSTRACT

The present disclosure relates to a liquefied gas storage tank and a ship including the same, the liquefied gas storage tank including: a wall configured to form a storage space for accommodating liquefied gas and having a dome formed on its upper surface for inflow and outflow of the liquefied gas; a pump tower having an upper end fixed to the dome and (Continued)

provided with a pipe configured to load and unload liquefied gas and a discharge pump configured to unload liquefied gas; and a lower rotary bearing portion provided on the wall forming a bottom of the storage space and configured to constrain a lower end of the pump tower.

16 Claims, 13 Drawing Sheets

(56) References Cited

FOREIGN PATENT DOCUMENTS

| | | |
|---|---|---|
| FR | 3092561 A1 | 8/2020 |
| JP | S61-104987 A | 5/1986 |
| JP | 7-247503 A | 9/1995 |
| JP | H09-126235 A | 5/1997 |
| JP | 2006-126562 A | 5/2006 |
| JP | 2016-173184 A | 9/2016 |
| JP | 2019-173424 A | 10/2019 |
| KR | 10-2010-0103266 A | 9/2010 |
| KR | 20-0452608 Y1 | 3/2011 |
| KR | 10-2013-0017704 A | 2/2013 |
| KR | 10-2013-0033003 A | 4/2013 |
| KR | 10-2014-0052814 A | 5/2014 |
| KR | 10-2014-0101082 A | 8/2014 |
| KR | 10-1591781 B1 | 2/2016 |
| KR | 10-1775038 B1 | 9/2017 |
| KR | 20180076930 A | 7/2018 |
| KR | 10-2018-0086704 A | 8/2018 |
| KR | 10-2018-0086705 A | 8/2018 |
| KR | 10-2038403 B1 | 10/2019 |
| KR | 10-2019-0136623 A | 12/2019 |
| KR | 10-2019-0142937 A | 12/2019 |
| KR | 10-2019-0142938 A | 12/2019 |
| WO | 2016/021950 A1 | 2/2016 |

OTHER PUBLICATIONS

Office Action for the Japanese Patent Application No. 2022-573743 issued by the Japanese Patent Office on Oct. 31, 2023.
Office Action for the Chinese Patent Application No. 202180039028.4 issued by the Chinese Patent Office on Jun. 11, 2025.

* cited by examiner

LIQUEFIED GAS STORAGE TANK AND SHIP INCLUDING SAME

This application is a national stage application of PCT/KR2021/008383 filed on Jul. 1, 2021, which claims priority to Korean patent application number 10-2020-0082330 filed on Jul. 3, 2020. The disclosure of each of the foregoing applications is incorporated herein by reference in its entirety.

TECHNICAL FIELD

The present disclosure relates to a liquefied gas storage tank and a ship including the same.

BACKGROUND ART

With recent technology development, liquefied gas such as liquefied natural gas (LNG) and liquefied petroleum gas (LPG) is widely used in replacement of gasoline or diesel.

In ships that transport or store liquefied gas such as LNG at sea, for example, LNG carriers, LNG RV (Regasification Vessel), LNG FPSO (Floating, Production, Storage and Offloading), and LNG FSRU (Floating Storage and Regasification Unit), liquefied gas storage tanks (referred to as a "cargo hold") are installed to store LNG in a cryogenic liquid state.

A pump tower for the inflow and outflow of the liquefied gas is installed in the liquefied gas storage tank. An upper end of the pump tower is fixedly installed to a dome of the liquefied gas storage tank, and a lower end is guided by a guide structure provided on the inner floor of the liquefied gas storage tank.

However, the pump tower is provided in a form extending vertically to correspond to the height of the liquefied gas storage tank, and vertical contraction/expansion may occur by the liquefied gas. In consideration thereof, the guide structure may have a structure that is constrained in the horizontal direction with respect to a lower end of the pump tower while vertical movement is allowed.

In other words, since the lower end of the pump tower is not fixed to the guide structure, the pump tower is in a state that is substantially suspended while only the upper end is fixed to the dome, which may cause a problem concerning structural stability. Therefore, when it comes to the pump tower and the guide structure, various research and development that may improve structural stability are in progress.

DISCLOSURE OF THE INVENTION

Technical Goals

The present disclosure has been proposed to solve the problems of the related art as described above, and an object of the present disclosure is to enhance structural stability by improving a structure that may guide a lower end of a pump tower in a liquefied gas storage tank.

Technical Solutions

A liquefied gas storage tank according to an aspect of the present disclosure includes a wall configured to form a storage space for accommodating liquefied gas and having a dome formed on its upper surface for inflow and outflow of liquefied gas; a pump tower having an upper end fixed to the dome and provided with a pipe configured to load and unload liquefied gas and a discharge pump configured to unload liquefied gas; and a lower rotary bearing portion provided on the wall forming a bottom of the storage space and configured to constrain a lower end of the pump tower, wherein the pump tower includes an upper rotary bearing portion which is guided to have horizontal movement constrained while vertical movement is allowed by the lower rotary bearing portion, and the lower rotary bearing portion includes a plurality of constraining portions which are radially disposed based on a vertical center and provided side by side with the vertical center to have a plurality of constraining surfaces, respectively, so that the upper rotary bearing portion is seated among the plurality of constraining portions.

Specifically, the lower rotary bearing portion may include a fixed portion fixed to the wall to protrude inward from the wall and having a circular cross section; and the plurality of constraining portions radially disposed around the fixed portion.

Specifically, the constraining portion may have an arc shape to connect a pair of the constraining surfaces that are spaced apart at a predetermined angle.

Specifically, the constraining portion may be provided point-symmetrically based on the vertical center.

A liquefied gas storage tank according to another aspect of the present disclosure includes a wall configured to form a storage space for accommodating liquefied gas and having a dome formed on its upper surface for inflow and outflow of liquefied gas; a pump tower having an upper end fixed to the dome and provided with a pipe configured to load and unload the liquefied gas and a discharge pump configured to unload liquefied gas; and a lower rotary bearing portion provided on the wall forming a bottom of the storage space and configured to constrain a lower end of the pump tower, wherein the pump tower includes an upper rotary bearing portion which is guided to have horizontal movement constrained while vertical movement is allowed by the lower rotary bearing portion, the lower rotary bearing portion includes a plurality of constraining portions which are radially disposed based on a vertical center and provided side by side with the vertical center to constrain the upper rotary bearing portion, and the upper rotary bearing portion includes a plurality of seating portions protruding downward of the pump tower so as to be inserted among the plurality of constraining surfaces and having a seating surface facing the constraining surface, and a reinforcing portion configured to connect the plurality of seating portions having the seating surfaces at each different angle.

Specifically, the seating portion may include: a protrusion vertically protruding downward of the pump tower; and a reinforcing rib provided at an upper end of the protrusion, wherein the seating surface is provided perpendicular to the protrusion to form a T-shape with the protrusion.

Specifically, the seating portion may further include a reinforcing plate which is provided parallel to the protrusion and in which the seating surface is installed.

Specifically, the reinforcing portion may be configured to connect the plurality of seating portions that are spaced apart to have a 90 degree angle.

Specifically, the reinforcing portion may have a shape provided to be curved or bent at least once in order to connect the plurality of seating portions disposed at each different angle.

Specifically, the seating portion may be provided point-symmetrically based on the vertical center.

A liquefied gas storage tank according to another aspect of the present disclosure includes a wall configured to form a storage space for accommodating liquefied gas and having a dome formed on an upper surface for inflow and outflow of liquefied gas; a pump tower having an upper end fixed to the dome and provided with a pipe configured to load and unload the liquefied gas and a discharge pump configured to unload the liquefied gas; and a lower rotary bearing portion provided on the wall forming a bottom of the storage space, configured to constrain a lower end of the pump tower, and provided with a fuel pump configured to supply the liquefied gas to an engine, wherein the lower rotary bearing portion includes a constraining portion having a plurality of constraining surfaces which are radially disposed based on a vertical center and provided side by side with the vertical center to constrain a lower end of the pump tower; an extended portion extended in a direction away from the vertical center from the constraining portion; and a pump support fixed to the extended portion and configured to support the fuel pump.

Specifically, a plurality of the constraining portions may be provided to be radially disposed based on the vertical center, and the extended portion may be provided to extend from any one of the constraining portions.

Specifically, at least a portion of the pump support may have a U-shape surrounding the fuel pump, and a reinforcing portion may be provided around the fuel pump side by side with a load direction of the fuel pump.

Specifically, the lower rotary bearing portion further includes a level gauge support configured to support a level gauging pipe which is configured to measure a level of the liquefied gas in the storage space, and the pump support has one side fixed to the extended portion based on a portion surrounding the fuel pump while the level gauge support may be fixed to the other side displaced from the one side.

Specifically, the fuel pump may implement, in addition to a function of supplying liquefied gas stored in the storage space to the engine, a stripping function to discharge liquefied gas remaining in the storage space to the outside or a spraying function to circulate liquefied gas on the bottom of the storage space to an upper portion of the storage space in a complex way.

A ship according to an aspect of the present disclosure has the liquefied gas storage tank.

Advantageous Effects

A liquefied gas storage tank and a ship including the same according to the present disclosure enable stable support of a pump tower by improving the shape of a lower portion of the pump tower as well as a portion that is provided on an inner bottom of the liquefied gas storage tank and guides a lower end portion of the pump tower.

BEST MODE FOR CARRYING OUT THE INVENTION

The objects, specific advantages, and novel features of the present disclosure will become more apparent from the following detailed description and preferred example embodiments taken in conjunction with the accompanying drawings. In the present specification, in adding reference numbers to the components of each drawing, it should be noted that only the same components are given the same number as possible even though they are indicated on different drawings. In addition, in describing the present disclosure, if it is determined that a detailed description of a related known technology may unnecessarily obscure the gist of the present disclosure, the detailed description thereof will be omitted.

Hereinafter, preferred embodiments of the present disclosure will be described in detail with reference to the accompanying drawings.

For reference, the present disclosure includes a ship equipped with a liquefied gas storage tank to be described below. Here, the ship may be one that uses liquefied gas at least as fuel for propulsion/power generation, and is a concept that all includes gas carriers, merchant ships that transport cargo or people other than gas, FSRUs, FPSOs, bunkering vessels, and offshore plants.

Also for reference, hereinafter, it is noted that a vertical center may refer to a certain point on a vertical center line of a lower rotary bearing portion, and the vertical center line of the lower rotary bearing portion may not coincide with the vertical center line of a pump tower.

Figure 1:
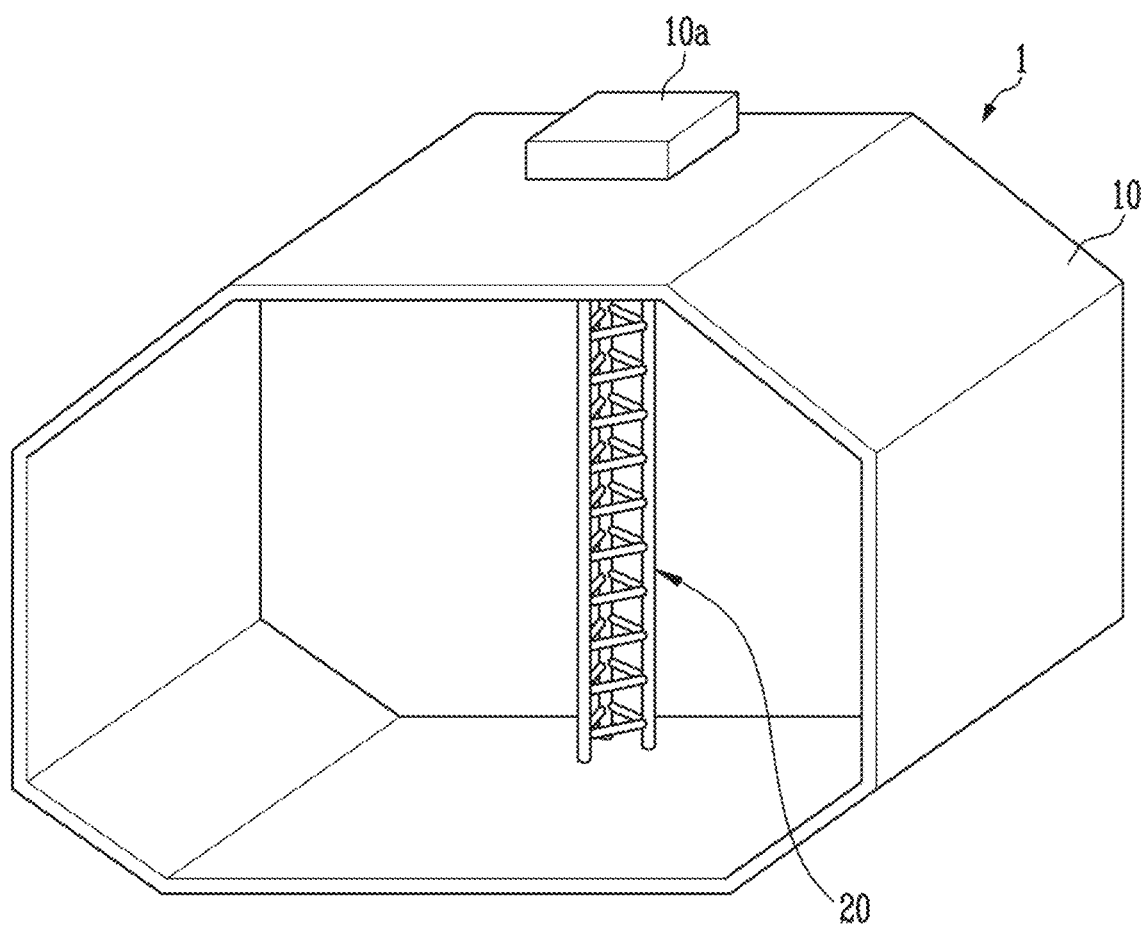
FIG. 1 is a perspective view of a liquefied gas storage tank in accordance with the present disclosure.
Figure 2:
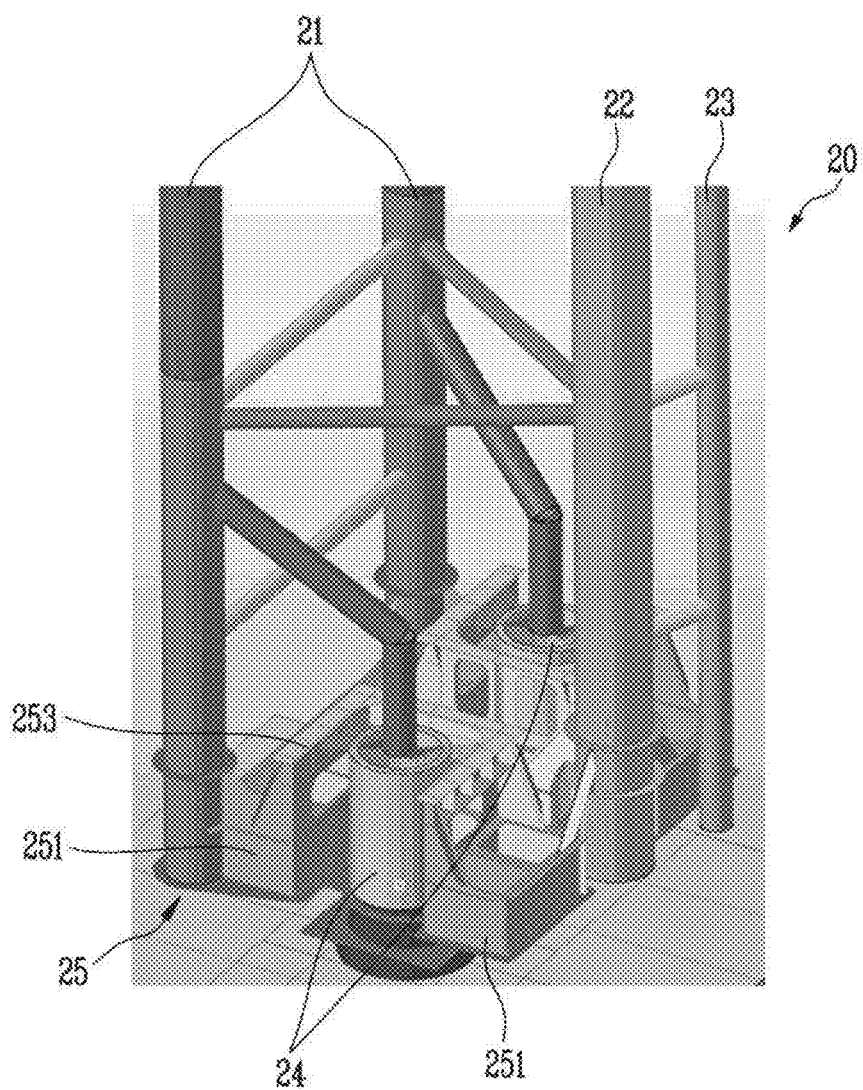
FIG. 2 is a partial perspective view of a pump tower in accordance with a first example embodiment of the present disclosure.
Figure 3:
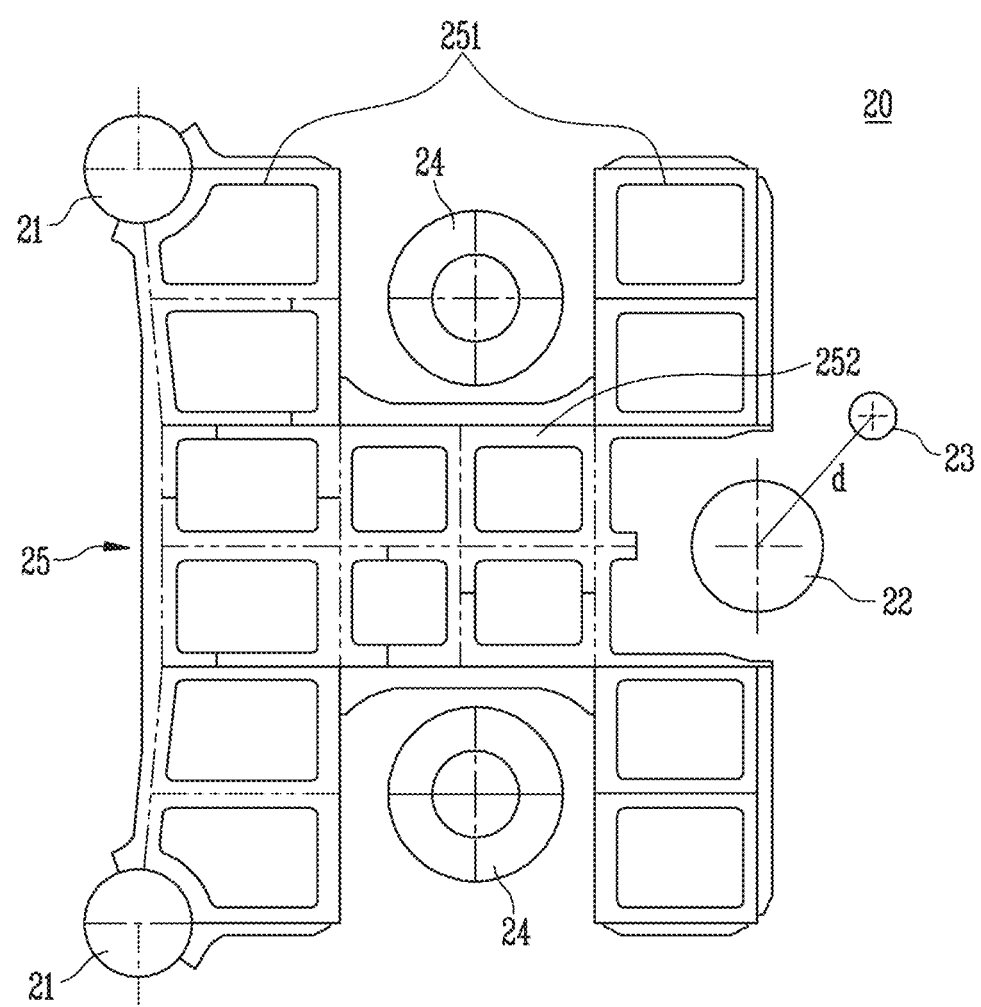
FIG. 3 is a cross-sectional view of the pump tower in accordance with the first example embodiment of the present disclosure.

FIG. 1 is a perspective view of a liquefied gas storage tank according to the present disclosure, and FIG. 2 is a partial perspective view of a pump tower according to a first example embodiment of the present disclosure. FIG. 3 is a cross-sectional view of the pump tower according to the first example embodiment of the present disclosure.

Before describing each example embodiment below, a liquefied gas storage tank 1 of the present disclosure will be schematically described with reference to FIG. 1 first.

Referring to FIG. 1, the liquefied gas storage tank 1 of the present disclosure includes a wall 10 and a pump tower 20.

The wall 10 is configured to form a storage space for accommodating the liquefied gas. To this end, the wall 10 may be configured to form the storage space with at least six surfaces, and for example, the storage space may have an octagonal cross section.

In addition, the wall 10 may have a thermal insulation structure configured to protect the liquefied gas stored therein from evaporation due to heat penetration. For example, the wall 10 may have a double insulating structure and a double sealing structure.

Specifically, the wall 10 may have a structure including a secondary insulating wall (not shown) provided on a hull side, a secondary barrier (not shown) provided inside the secondary insulating wall, a primary insulating wall (not shown) provided inside the secondary barrier, and a primary barrier (not shown) provided inside the primary insulating wall.

In this case, for the insulating wall, an insulating block such as polyurethane foam or an insulating box configured to accommodate an insulating material such as perlite may be used. In addition, for the barrier, a metal sheet such as SUS or INVAR or a composite material mixed with aluminum and glass fiber may be used.

Such the wall 10 is formed, on an upper surface, with a dome 10a for inflow and outflow of liquefied gas. An opening (not shown) is formed in the wall 10 forming the upper surface of the storage space, and a dome 10a coaming (not shown) that protrudes upward is provided in the opening, wherein the opening may be closed as a dome 10a cover (not shown) is seated in the dome 10a coaming.

Here, the dome 10a cover is provided penetrably with various pipes which are provided in the pump tower 20 to be described later, and the liquefied gas may be discharged from the storage space to the outside through the pipe penetrating the dome 10a or introduced into the storage space from the outside. In addition, boil-offgas generated in the storage space may also be discharged to the outside through the pipe penetrating the dome 10a.

The pump tower 20 has an upper end fixed to the dome 10a and has a pipe for loading and unloading of liquefied gas. The pump tower 20 may be provided in the form of a column including pipes vertically extending from the dome 10a to the bottom of the storage space and a framework formed in a truss structure configured to connect the pipes to each other.

Such the pump tower 20 may be provided to allow only the upper end to be fixed to the dome 10a while the lower end is not fixed. In other words, the lower end of the pump tower 20 is provided to be unconstrained at least in the vertical direction. This is for the pump tower 20 corresponding to the height of the storage space to prepare to be contracted/expanded due to the cryogenic liquefied gas.

However, in order to make the pump tower 20, whose upper end is fixed while a lower end is free, stably placed, the lower rotary bearing portion 30 may be provided on the wall 10 forming the bottom of the storage space.

The lower rotary bearing portion 30 is configured to constrain horizontal movement of the pump tower 20 while allowing the vertical movement thereof, thereby minimizing rotation or shaking of the pump tower 20. The lower rotary bearing portion 30 will be described in detail below with reference to FIG. 4.

First, hereinafter, the pump tower 20 of the first example embodiment will be described with reference to FIGS. 2 and 3.

Referring to FIGS. 2 and 3, the pump tower 20 is provided to include a plurality of pipes. For example, the pump tower 20 includes an unloading pipe 21, an auxiliary pipe 22, and a loading pipe 23.

The unloading pipe 21 may be provided in plurality of at least two or more for unloading of the liquefied gas. For example, the pair of unloading pipes 21 may be provided to be able to mutually back up.

A discharge pump 24 may be assigned to each unloading pipe 21, and the discharge pump 24 may be provided at a position displaced from the unloading pipe 21 in the vertical direction, while a lower portion of the unloading pipe 21 may be provided to be connected to the discharge pump 24 after being bent obliquely toward the discharge pump 24.

The auxiliary pipe 22 may be provided to prepare for an event taking place during unloading through the unloading pipe 21 and referred to as an emergency pipe. After a pump for emergency discharge is inserted into the auxiliary pipe 22 in an emergency situation, the liquefied gas in the storage space may be discharged to the outside through the pump for emergency discharge, and, for the same, the auxiliary pipe 22 may have a larger diameter than the unloading pipe 21.

The auxiliary pipes 22 may be provided in a smaller number than the unloading pipes 21, for example, one may be provided. At this time, the pair of unloading pipes 21 and a single auxiliary pipe 22 may be arranged in a triangle.

The loading pipe 23 is configured to load the liquefied gas into the storage space. The loading pipe 23 may have a hollow shape with a bottom end opened in order to deliver the liquefied gas introduced from the outside to the inner bottom of the storage space.

The loading pipe 23 may be provided on one side of the auxiliary pipe 22, and when the pair of unloading pipes 21 is triangularly disposed with the auxiliary pipe 22, the loading pipe 23 may also be triangularly disposed with the pair of unloading pipes 21.

In this case, the loading pipe 23 may be disposed outside the triangle formed by the pair of unloading pipes 21 and the auxiliary pipe 22, and may be fixedly installed on the auxiliary pipe 22 through a horizontal reinforcing material.

In other words, the loading pipe 23 may be provided at a position farther than the auxiliary pipe 22 from the vertical center of the pump tower 20, which is to protect the discharge pump 24 from the cryogenic liquefied gas introduced into the storage space through the loading pipe 23.

For example, referring to FIG. 3, the loading pipe 23 may be disposed to be spaced apart from the auxiliary pipe 22 by a predetermined distance d or more, thereby more efficiently protecting the discharge pump 24 from the cryogenic liquefied gas. Here, the predetermined distance d may be determined based on the width of the pipe support 251.

The pump tower 20 may variously include a gas sampling pipe (not shown), a level gauging pipe (not shown), and cable pipe (not shown) for power/signal transmission of the discharge pump 24, in addition to the unloading pipe 21, the auxiliary pipe 22, and the loading pipe 23 as described above.

An upper rotary bearing portion 25 may be provided at a lower end of the pump tower 20. The upper rotary bearing portion 25 is configured to constrain horizontal movement by the lower rotary bearing portion 30 to be described later while supporting the unloading pipe 21.

The upper rotary bearing portion 25 is provided at a lower portion of the unloading pipe 21 and guided to make horizontal movement constrained w % bile vertical movement is allowed by the lower rotary bearing portion 30. The pair of unloading pipes 21 and the auxiliary pipe 22 may be fixedly installed on the upper rotary bearing portion 25, and the loading pipe 23 may be indirectly fixed to the upper rotary bearing portion 25 through the auxiliary pipe 22.

In addition, the discharge pump 24 may be fixedly installed on the upper rotary bearing portion 25. Accordingly, the height of the lower end of the unloading pipe 21 and the discharge pump 24 may vary upon contraction/expansion of the pump tower 20.

The upper rotary bearing portion 25 includes a pipe support 251 and a connector 252. The pair of pipe supports 251 is provided in parallel with the discharge pump 24 interposed therebetween, and the pipe support 251 on one side supports the plurality of unloading pipes 21. In addition, the pipe support 251 on the other side may be configured to support the auxiliary pipe 22 or the loading pipe 23.

The pipe support 251 on one side is provided to support the unloading pipe 21 at both ends. In other words, the pipe support 251 on one side is provided in a form interconnecting the pair of unloading pipes 21.

On the other hand, the pipe support 251 on the other side is provided to support the auxiliary pipe 22 at the center. To this end, a central portion of the pipe support 251 on the other side may be provided in a form recessed toward the vertical center of the pump tower 20, and the auxiliary pipe 22 may be located in the recessed portion.

The pair of pipe supports 251 may be provided in an open framework structure for weight reduction. Thereby, a closed space is omitted in the pipe support 251 to increase work efficiency.

In addition, the pair of pipe supports 251 is based on a rectangular parallelepiped shape, and to effectively support the unloading pipe 21 provided at both ends, the pipe support 251 on one side may have a corner portion recessed in a curved shape so as to surround the unloading pipe 21 at least partially.

In addition, a lower surface of the pipe support 251 on one side may have a shape whose cross-sectional area is expanded, and a portion where the cross-sectional area is expanded is provided in a shape to cover all the lower surface of the unloading pipe 21, thereby stably supporting the lower end of the unloading pipe 21.

Though the lower surface of the pipe support 251 on the other side may also have the expanded cross-sectional area, it is not used for supporting the auxiliary pipe 22, but for structural strength of the pipe support 251 itself.

The auxiliary pipe 22 may be located in a portion recessed toward the vertical center in the pipe support 251 on the other side and fixed to the upper surface of the pipe support 251 through various structures such as a support (not shown) provided to be oblique to a vertical direction.

As such, the pipe support 251 on one side for supporting the unloading pipe 21 and the pipe support 251 on the other side for supporting the auxiliary pipe 22 may be interconnected by the connector 252. The connector 252 may be provided perpendicular to the pair of pipe supports 251 provided in parallel to connect the pipe supports 251, whereby the upper rotary bearing portion 25 may have an H-shape by the pair of pipe supports 251 and the connector 252.

A pair of discharge pumps 24 may be disposed between the pair of pipe supports 251, with a smaller distance from each other compared to the unloading pipe 21, and at least a part of each unloading pipe 21 is branched obliquely to be connected to each discharge pump 24.

The connector 252 may be provided to connect the pair of pipe supports 251 between the pair of discharge pumps 24. At this time, the connector 252 may also be provided in an open framework structure in order to suppress formation of a closed space as the pipe support 251.

The pair of pipe supports 251 and the connector 252 may partially form a C-shape or a U-shape. At this time, the upper rotary bearing portion 25 is provided to have the pair of pipe supports 251 and connectors 252 surround the discharge pump 24.

The pipe support 251 and the connector 252 have brackets 253 extending upward for reinforcement of structural strength. At this time, the bracket 253 may be provided to surround the discharge pump 24, thereby sufficiently supporting the load of the discharge pump 24.

In addition, a portion of the bracket 253 is fixed onto the unloading pipe 21 and the auxiliary pipe 22, so as to sufficiently bear the horizontal shaking of the unloading pipe 21. The shape of the bracket 253 is not particularly limited.

However, the upper end of the bracket 253 is provided side by side at the same height as the upper end of the discharge pump 24 while the lower end of the discharge pump 24 is provided side by side at the same height as the lower end of the pipe support 251, such that the lower end and upper end of the discharge pump 24 may be stably fixed and installed to a lower end of each pipe support 251 and an upper end of the bracket 253 by a separate fixing structure.

And/or, the discharge pump 24 may have a side surface fixed to the upper end of the pipe support 251, and the structure that the discharge pump 24 is fixed to the upper rotary bearing portion 25 is not particularly limited.

The unloading pipe 21, the auxiliary pipe 22, the loading pipe 23, and the discharge pump 24 may be fixed to the upper rotary bearing portion 25, and the height of the discharge pump 24 may vary in a vertical direction when the unloading pipe 21 shrinks due to cryogenic liquefied gas.

However, the liquefied gas remaining on the bottom of the storage space may all be discharged by a stripping function of the fuel pump 26 described in another example embodiment below, which will be described later.

Hereinafter, the lower rotary bearing portion 30 configured to constrain the upper rotary bearing portion 25 will be described with reference to FIGS. 4 and 5.

Figure 4:
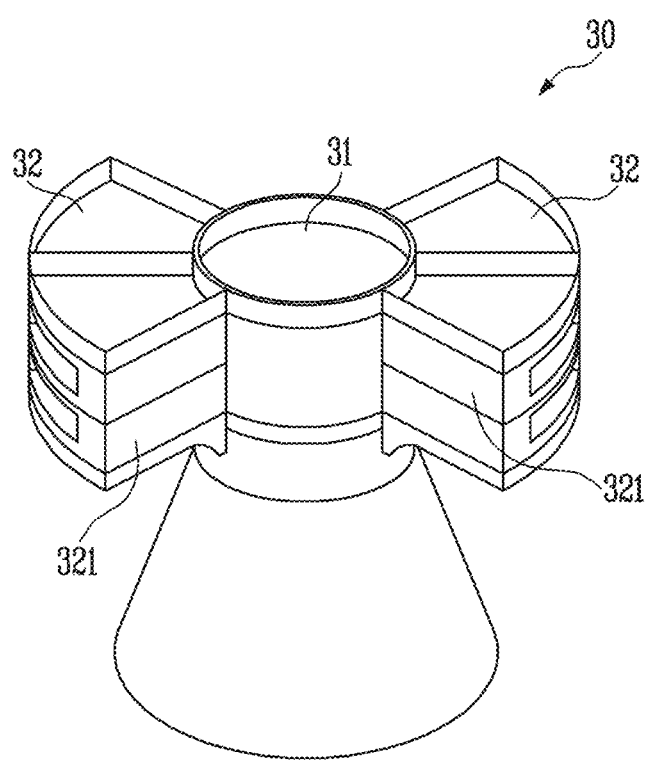
FIG. 4 is a perspective view of a lower rotary bearing portion in accordance with the first example embodiment of the present disclosure.
Figure 5:
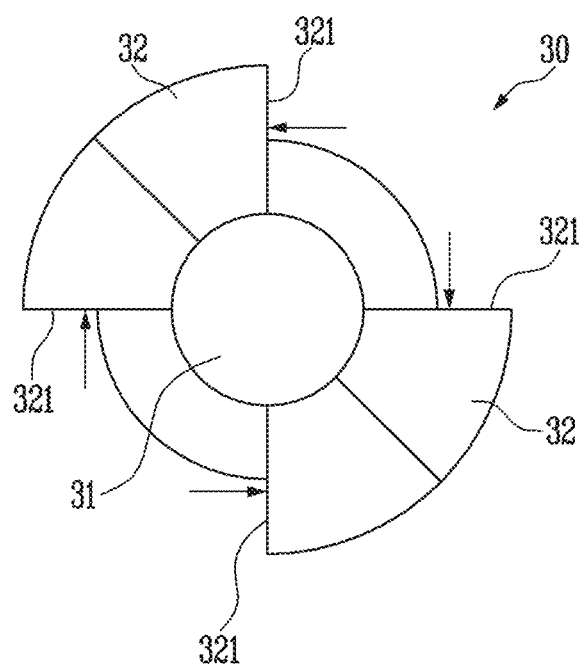
FIG. 5 is a plan view of the lower rotary bearing portion in accordance with the first example embodiment of the present disclosure.

FIG. 4 is a perspective view of the lower rotary bearing portion according to the first example embodiment of the present disclosure, and FIG. 5 is a plan view of the lower rotary bearing portion according to the first example embodiment of the present disclosure.

Referring to FIGS. 4 and 5, the lower rotary bearing portion 30 may be fixedly installed on the wall 10 forming the bottom of the storage space and configured to constrain the horizontal movement of the upper rotary bearing portion 25 while allowing vertical movement so as to prevent horizontal movement or rotation with respect to the lower end of the pump tower 20.

The lower rotary bearing portion 30 includes a fixed portion 31 and a constraining portion 32. The fixed portion 31 is fixed to the wall 10 so as to protrude inward from the wall 10. The fixed portion 31 may have a lower end fixed to an outer wall (e.g., a hull) of the liquefied gas storage tank 1, and an upper end may be located inside the storage space while penetrating the wall 10.

At this time, the fixed portion 31 may be provided to allow a portion that is exposed to the inside of the storage space at least to have a circular cross section, and the constraining portion 32 may be radially disposed around the fixed portion 31.

The constraining portion 32 is provided in plurality so as to be radially disposed around the fixed portion 31. At this time, the constraining portion 32 has a constraining surface 321. The constraining surface 321 is provided to be placed on a virtual plane on which the vertical center line is placed and also provided in plurality in the constraining portions 32. The plurality of constraining surfaces 321 provided in the constraining portions 32 are radially disposed with respect to the vertical center and may be configured to constrain the upper rotary bearing portion 25.

As an example, the constraining portion 32 may be provided in a form that connects a pair of constraining surfaces 321 spaced apart at a predetermined angle with respect to a vertical center, and such the constraining portion 32 may have a form of an arc (or a cut donut, etc.).

Of course, the constraining portion 32 has a pair of constraining surfaces 321, but it is also possible to have a shape such as a triangle or a square. When the pair of constraining surfaces 321 provided on one constraining portion 32 has a 90 degree angle as shown in the drawing, depending on the shape of the outer surface far from the vertical center in the constraining portion 32, the overall shape of the constraining portion 32 may be determined in various ways.

The constraining portion 32 may be radially disposed with respect to the fixed portion 31 to be provided point-symmetrically with respect to the vertical center. For example, when a quadrant is virtually set based on the vertical center, the constraining portion 32 is disposed in the first and third quadrants, while the second and fourth quadrants may be empty as a space between the constraining portions 32.

At this time, the upper rotary bearing portion 25 may be placed in a space between the empty constraining portions 32, and when the horizontal cross section is viewed from a portion where the constraining portion 32 is provided, the constraining surface 321 may face the upper rotary bearing portion 25.

For example, the upper rotary bearing portion 25 may have a seating surface 2541 at a portion facing the constraining surface 321 and form a contact area with a smaller area than the constraining surface 321 to be in contact with the constraining surface 321.

Therefore, when the pump tower 20 rotates or moves horizontally, the constraining surface 321 may come in contact with the upper rotary bearing portion 25 to restrict the horizontal movement of the upper rotary bearing portion 25. That is, as shown in FIG. 5, when the translation/rotation load of the pump tower 20 acts in the arrow direction, the constraining surface 321 blocks the movement of the upper rotary bearing portion 25, so that the lower rotary bearing portion 30 may stably fix the lower end position of the pump tower 20.

Of course, even if the constraining surface 321 and the upper rotary bearing portion 25 come in contact, the constraining surface 321 may be provided to have a material/surface (synthetic resin such as HDPE) that allows the vertical movement of the upper rotary bearing portion 25, thereby preparing for the contraction of the pump tower 20.

Such the lower rotary bearing portion 30 has a relatively simple shape having the arc-shaped constraining portion 32 provided on the cylindrical fixed portion 31 while it is possible to constrain translational movement and rotational movement through four-point sliding support only with two constraining portions 32.

Hereinafter, with reference to FIGS. 6 and 7, the shape of the upper rotary bearing portion 25 corresponding to the lower rotary bearing portion 30 described above will be described.

For reference, the pipe support 251 and the connector 252 of the upper rotary bearing portion 25 described in FIG. 3 correspond to the upper portion of the upper rotary bearing portion 25, the content to be described below is the lower portion of upper rotary bearing portion 25, and the following configuration may be installed on the lower surface of the pipe support 251 or the connector 252.

Figure 6:
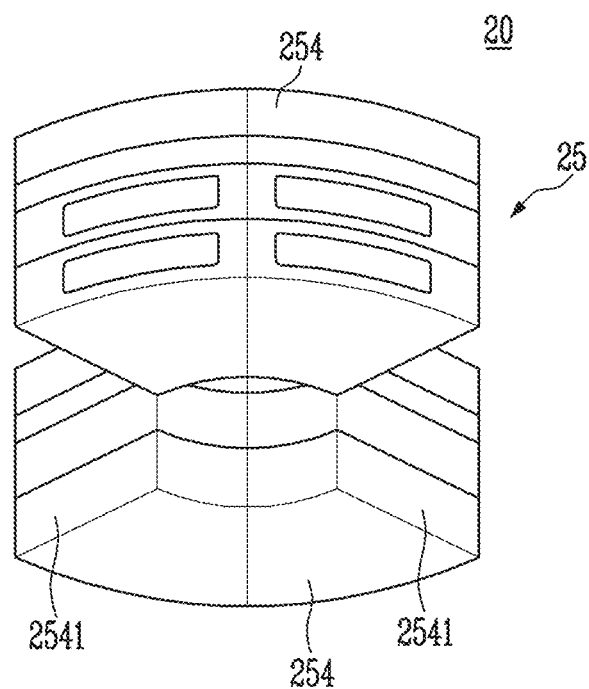
FIG. 6 is a partial perspective view of the pump tower in accordance with the first example embodiment of the present disclosure.
Figure 7:
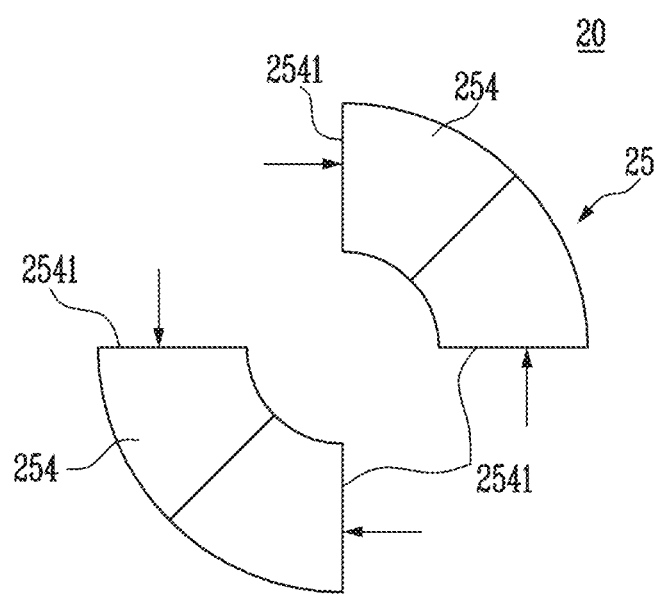
FIG. 7 is a bottom view of the pump tower in accordance with the first example embodiment of the present disclosure.

FIG. 6 is a partial perspective view of the pump tower according to the first example embodiment of the present disclosure, and FIG. 7 is a bottom view of the pump tower according to the first example embodiment of the present disclosure.

Referring to FIGS. 6 and 7, the upper rotary bearing portion 25 provided on the lower surface of the pump tower 20 may be provided in a shape corresponding to the lower rotary bearing portion 30 in FIGS. 4 and 5.

The upper rotary bearing portion 25 includes a seating portion 254. The seating portion 254 has a plurality of seating surfaces 2541 which may be configured to face the constraining surface 321 described above.

The seating portion 254 has an arc shape to correspond to the constraining portion 32 of the lower rotary bearing portion 30 and protrudes downward of the pump tower 20 so as to be inserted within the plurality of constraining surfaces 321. In addition, the seating portion 254 may be configured, to correspond to the constraining portion 32 connecting the pair of constraining surfaces 321 in an arc shape, in a structure that connects the pair of seating surfaces 2541 that are spaced apart at a predetermined angle based on the vertical center in an arc shape.

At this time, in the seating portion 254, a plurality of seating portions 254 may be radially disposed based on the vertical center, but in the upper rotary bearing portion 25, the seating portion 254 may be radially disposed at a position spaced apart by a predetermined radius from the vertical center. This is to avoid interference with the fixed portion 31.

The seating portion 254 of the upper rotary bearing portion 25 may be provided point-symmetrically with respect to the vertical center so as to correspond to the constraining portion 32 of the lower rotary bearing portion 30. Referring back to the description of the constraining portion 32 above, when the quadrant is virtually set based on the vertical center, the constraining portion 32 may be disposed in the first and third quadrants while the second and fourth quadrants may be empty as a space between the constraining portions 32, such that, as the seating portion 254 of the upper rotary bearing portion 25 is inserted in the second and fourth quadrants, the seating surface 2541 may be installed to face the constraining surface 321.

Therefore, as in FIG. 7, when the lower end of the pump tower 20 receives an external force in the horizontal direction, even if the relative translational/rotational load between the upper rotary bearing portion 25 and the lower rotary bearing portion 30 acts on the seating surface 2541, through the contact of each seating surface 2541 and the constraining surface 321 and the structural strength of the constraining portion 32 and the seating portion 254 having an arc shape, the horizontal movement of the lower end of the pump tower 20 may be effectively restricted.

As such, in an example embodiment, it is possible to implement stable support of each pipe by means of the upper rotary bearing portion 25 configured to effectively support the unloading pipe 21 and the auxiliary pipe 22 through the pair of pipe supports 251 and the connector 252.

In addition, in an example embodiment, the lower rotary bearing portion 30 has the arc-shaped constraining portion 32, the arc-shaped seating portion 254 is provided in the upper rotary bearing portion 25, and the horizontal movement of the lower end of the pump tower 20 may be efficiently held by implementing four-point sliding support between the constraining surface 321 of the constraining portion 32 and the seating surface 2541 of the seating portion 254 through the engagement between the pair of constraining portions 32 and the pair of seating portions 254.

Figure 8:
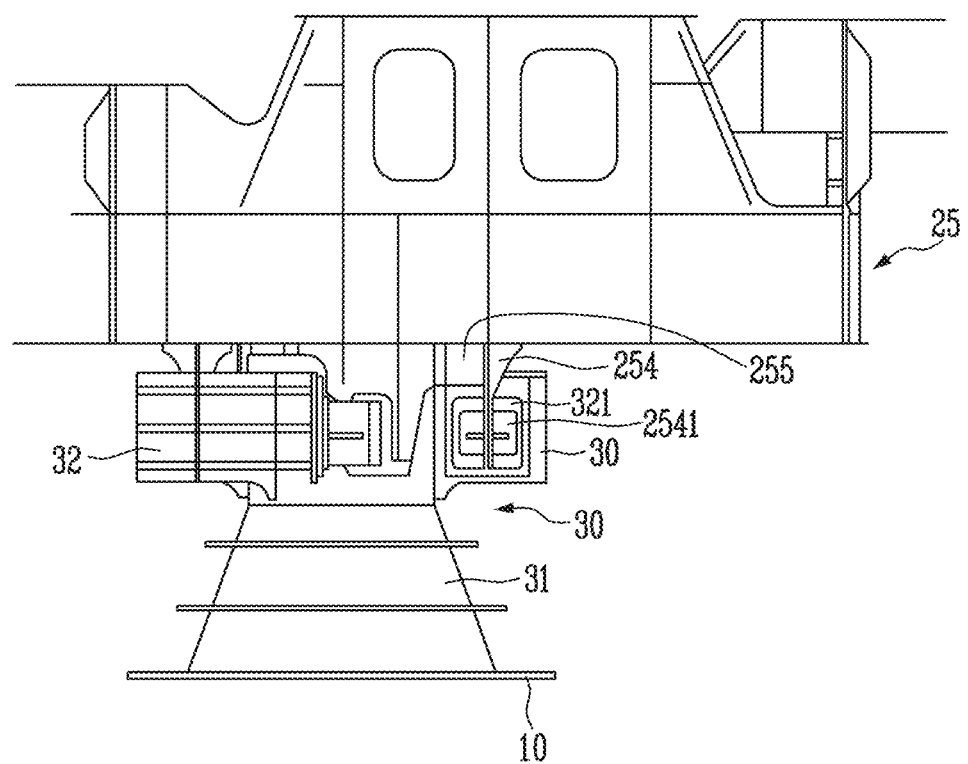
FIG. 8 is a side view of a pump tower and a lower rotary bearing portion in accordance with a second example embodiment of the present disclosure.
Figure 9:
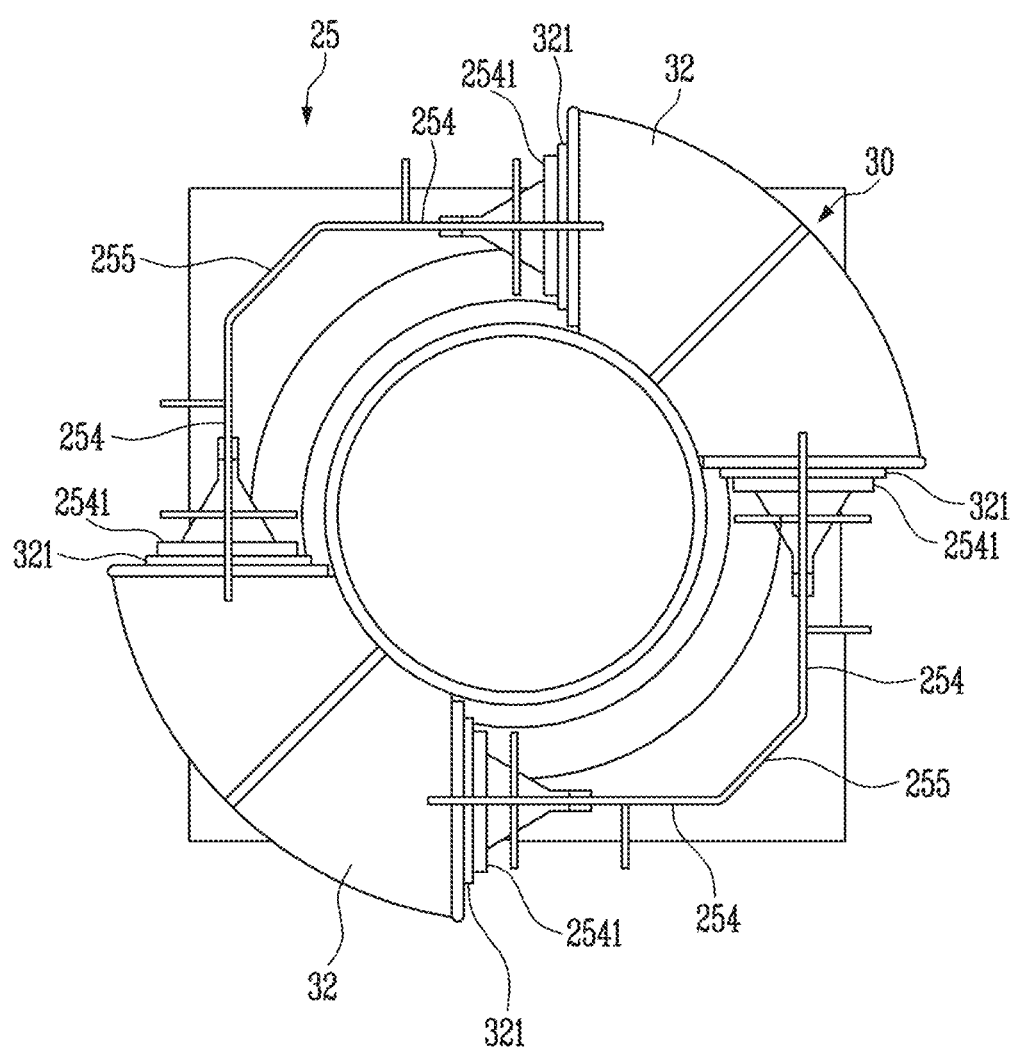
FIG. 9 is a bottom view of the pump tower in accordance with the second example embodiment of the present disclosure.
Figure 10:
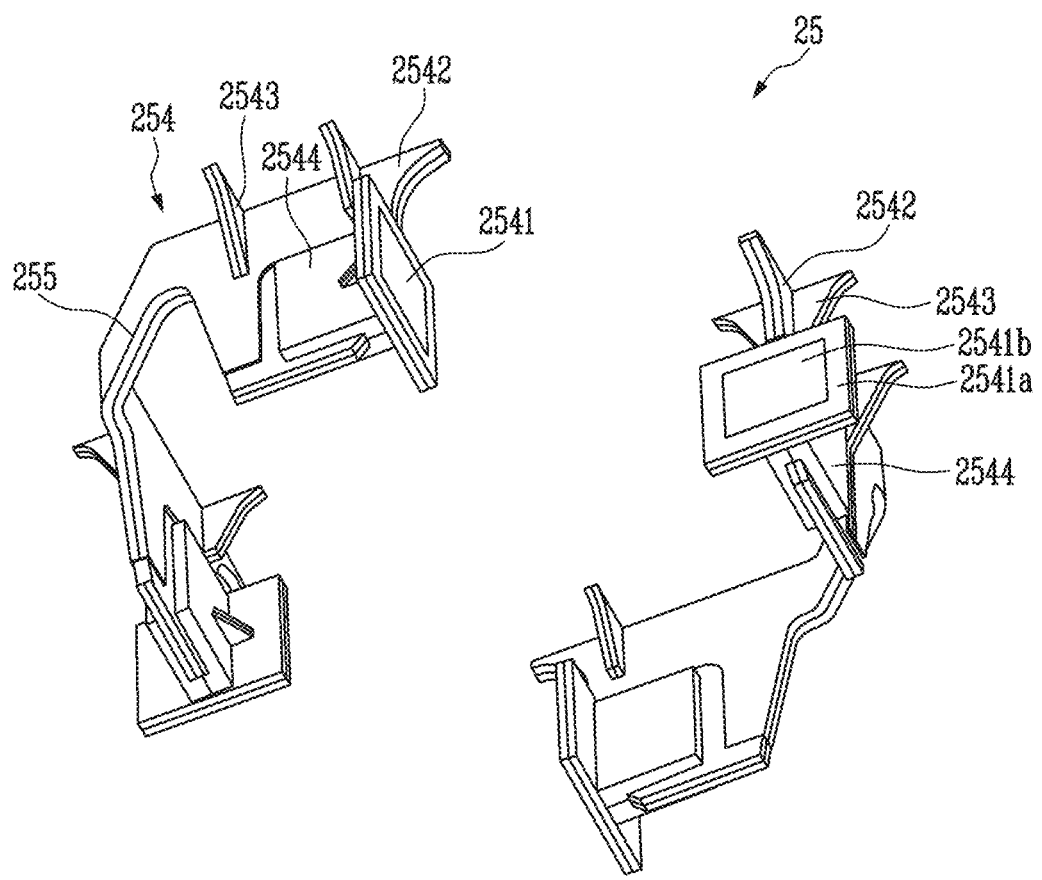
FIG. 10 is a partial perspective view of the pump tower in accordance with the second example embodiment of the present disclosure.

FIG. 8 is a side view of the pump tower and the lower rotary bearing portion according to the second example embodiment of the present disclosure, FIG. 9 is a bottom view of the pump tower according to the second example embodiment of the present disclosure, and FIG. 10 is a partial perspective view of the pump tower according to the second example embodiment of the present disclosure.

Hereinafter, it should be noted that example embodiments will be mainly described on the points that are different from the previous example embodiment, and parts omitted from the description will be replaced with the previous content, which are the same in other example embodiments below.

In an example embodiment, with respect to the same lower rotary bearing portion 30 as in the previous example embodiment, the upper rotary bearing portion 25 different from the previous example embodiment may be provided. The upper rotary bearing portion 25 according to an example embodiment has the seating portion 254 and a reinforcing portion 255.

The seating portion 254 protrudes downward of the pump tower 20 so as to be inserted within the plurality of constraining surfaces 321 and has the seating surface 2541 facing the constraining surface 321. Specifically, the seating portion 254 includes the protrusion 2542 vertically protruding downward of the pump tower 20, and the seating surface 2541 is provided perpendicular to the protrusion 2542.

The seating surface 2541 may include a peripheral portion 2541a made of a metal material, and a contact portion 2541b provided inside the peripheral portion, facing the constraining surface 321, and made of an elastic material.

At this time, the contact portion 2541b may be made of a material (synthetic resin such as HDPE) that may allow sliding motion in the vertical direction, the peripheral portion 2541a may be made of SUS, and the contact portion 2541b provided in the seating surface 2541 and made of a synthetic resin may come in contact with the constraining surface 321.

However, in order to reinforce the structural strength of the protrusion 2542, at least one or more reinforcing ribs 2543 may be provided at the upper end of the protrusion 2542. The reinforcing rib 2543 may be provided to restrict the horizontal deformation of the protrusion 2542 that is vertically protruded.

The seating surface 2541 may be vertically provided on the protrusion 2542, and the protrusion 2542 and the seating surface 2541 may be provided to form a T-shape. At this time, the reinforcing plate 2544 is provided between the seating surface 2541 and the protrusion 2542. The reinforcing plate 2544 is provided to be parallel to the protrusion 2542 and the seating surface 2541 may be installed.

The protrusion 2542 may protrude downward of the pump tower 20 in the form of a plate, wherein the insufficient thickness of the protrusion 2542 may cause a problem in tolerating the stress concentrated to the connected portion between the protrusion 2542 and the seating surface 2541. Therefore, in an example embodiment, by adding the reinforcing plate 2544 to a portion where the seating surface 2541 is provided in the protrusion 2542, the thickness of the protrusion 2542 may be reinforced to prepare for stress concentration.

The reinforcing plate 2544 may be provided parallel to the protrusion 2542 or may be provided in a stacked structure on the protrusion 2542. The reinforcing plate 2544 may be provided on both sides of the protrusion 2542 to sufficiently secure the thickness of a portion where the seating surface 2541 is installed.

Such the seating portion 254 is provided in plurality and disposed at a position spaced apart from the vertical center by a predetermined distance. Also, at least two of the plurality of seating portions 254 may be disposed to allow the seating surfaces 2541 to have different angles from each other.

As an example, in describing with reference to FIG. 9, provided may be the seating portion 254 which has a vertical seating surface 2541 and is disposed above and below the vertical center, and the seating portion 254 which has a horizontal seating surface 2541 and is disposed on the left and right of the vertical center. In this case, the plurality of seating portions 254 are provided point-symmetrically based on the vertical center.

However, the seating surface 2541 of the seating portion 254 may be disposed to be displaced from the vertical center. In other words, even if the seating surface 2541 is virtually extended, it may be provided not to meet the vertical center. In other words, the horizontal seating surfaces 2541 shown in the left and right of the vertical center in FIG. 9 are respectively deflected downward/upward compared to the vertical center, and the vertical seating surfaces 2541 shown above and below the vertical center in FIG. 9, may be deflected to the right/left respectively relative to the vertical center.

The plurality of seating portions 254 having seating surfaces 2541 of different angles may be connected by the reinforcing portion 255. The reinforcing portion 255 may be provided to connect the plurality of seating portions 254 that are spaced apart to have a 90 degree angle. However, as described above, since the seating surface 2541 of the seating portion 254 is displaced from the vertical center, the two seating portions 254 disposed at different angles may be broadened to have 90 degrees based on a specific point displaced from the vertical center.

The reinforcing portion 255 may be provided to interconnect the protrusions 2542 on the two seating portions 254 having each different angle and have a form provided to be curved or bent at least once to connect the plurality of seating portions 254.

However, when a portion bent at 90 degrees is provided in the reinforcing portion 255, there is a risk that stress may be excessively concentrated in the reinforcing portion 255 when it is intended to constrain rotational movement of the pump tower 20, such that the reinforcing portion 255 may have a shape bent at least twice at an obtuse angle. Alternatively, the reinforcing portion 255 may be provided in an arc shape.

As such, in an example embodiment, unlike seating portions 254 in the previous example embodiment that the upper rotary bearing portion 25 has an arc shape overall, a structure may be simplified using the reinforcing portion 255 configured to connect the pair of seating portions 254, and by securing sufficient structural strength through the shape of the reinforcing rib 2543 and the reinforcing portion 255, the horizontal movement of the lower end of the pump tower 20 may be efficiently constrained.

Figure 11:
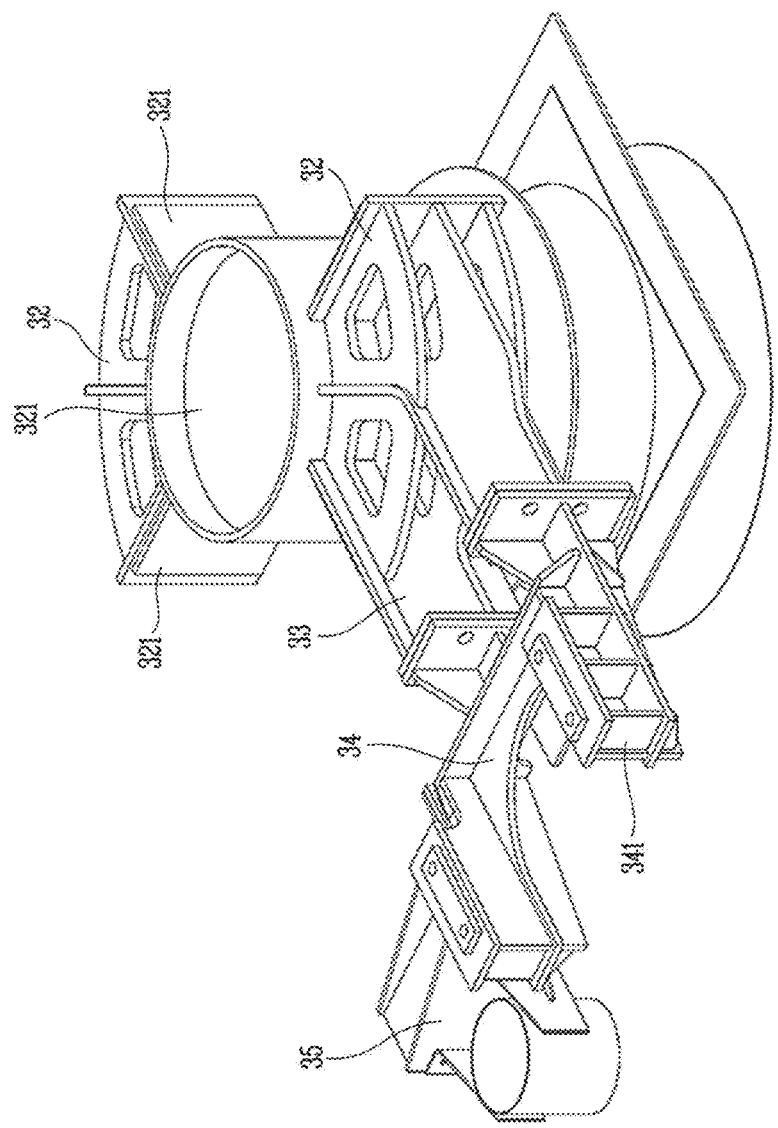
FIG. 11 is a perspective view of a lower rotary bearing portion in accordance with a third example embodiment of the present disclosure.
Figure 12:
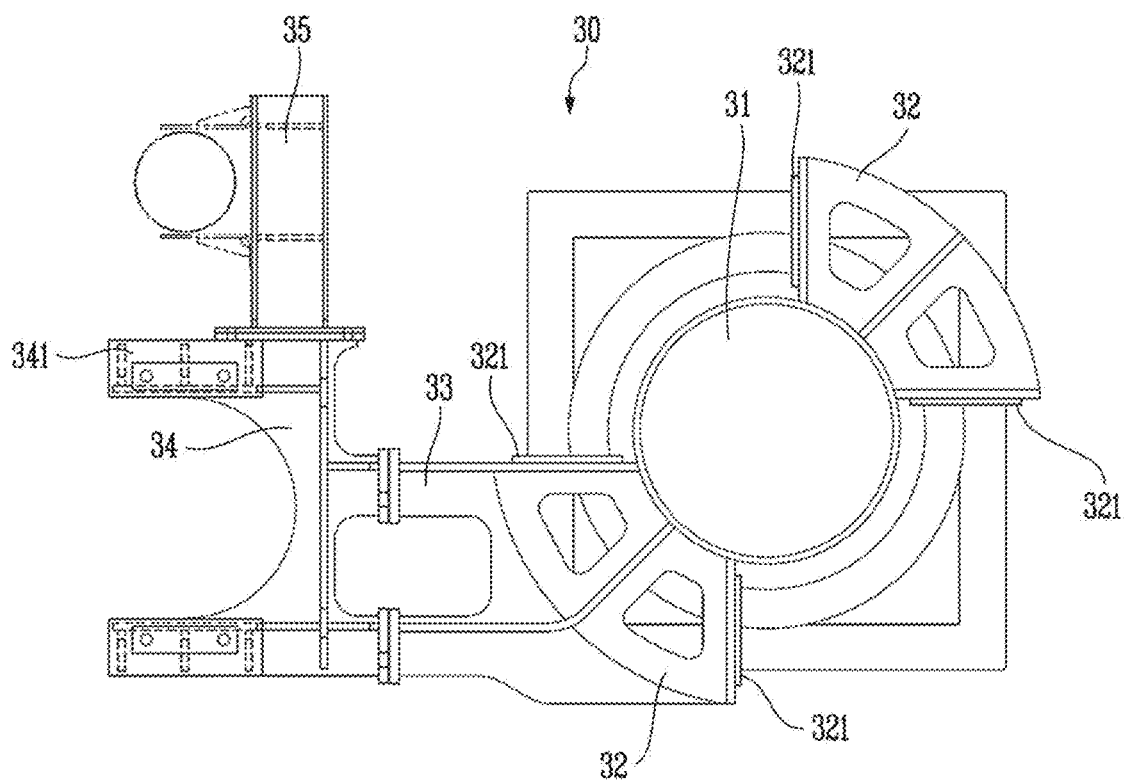
FIG. 12 is a plan view of the lower rotary bearing portion in accordance with the third example embodiment of the present disclosure.

FIG. 11 is a perspective view of the lower rotary bearing portion according to the third example embodiment of the present disclosure, and FIG. 12 is a plan view of the lower rotary bearing portion according to the third example embodiment of the present disclosure.

Referring to FIGS. 11 and 12, compared to the lower rotary bearing portion 30 described in the first example embodiment above, the lower rotary bearing portion 30 according to the third example embodiment of the present disclosure further includes the extended portion 33 and the pump support 34 while having the same constraining portion 32. The constraining portion 32 included in the lower rotary bearing portion 30 of an example embodiment is replaced with the previous content.

The extended portion 33 extends in a direction away from the vertical center from the constraining portion 32. The extended portion 33 is provided to extend only in any one constraining portion 32 among the pair of constraining portions 32 radially disposed with respect to the vertical center, whereby the constraining portion 32 in which the extended portion 33 is provided forms an asymmetric shape based on the vertical center.

The extended portion 33 may be integrated with any one of the constraining portions 32 as in the drawing, or unlike the drawing, it may be provided to be connected to the constraining portion 32 by bolts or welding after being separately manufactured.

To prevent the fuel pump (not shown) to be described later from interfering with the flow of liquefied gas through a pipe provided in the pump tower 20, the extended portion 33 may have a configuration in which the fuel pump 26 is placed at a position spaced apart from the vertical center by a predetermined distance and also have a configuration that implements a firm coupling of the pump support 34.

The extending direction of the extended portion 33 may be a direction displaced from the vertical center, and as an example, referring to FIG. 12, the extended portion 33 extends horizontally in the left direction, and the extension direction is deflected downward from the vertical center of the lower rotary bearing portion 30.

The pump support 34 is fixed to the extended portion 33 and is configured to support the fuel pump 26. Provided in the liquefied gas storage tank 1 is a stripping/spray pump for stripping to discharge the liquefied gas remaining in the storage space to the outside or for spraying to circulate the liquefied gas on the bottom of the storage space to the upper portion of the storage space. In addition, the fuel pump 26 configured to supply the liquefied gas stored in the storage space to an engine (propulsion engine, power generation engine, etc.) may be provided in the liquefied gas storage tank 1.

However, in an example embodiment, instead of separately having the stripping/spray pump and the fuel pump 26, a single pump may be provided to complexly implement the functions of the stripping/spray pump and the fuel pump 26.

Thereby, in an example embodiment, with no need to apply a structure for supporting two pumps (spray pump and fuel pump 26) respectively to the lower rotary bearing portion 30, a structure that supports only a single integrated pump (referred to as the fuel pump 26) is applied, thereby simplifying a structure of the lower rotary bearing portion 30.

In this way, the fuel pump 26 configured to perform a complex function such as stripping may be fixed by the pump support 34. At least a portion of the pump support 34 has a U-shape surrounding the fuel pump 26, and at least a portion of the circumference of the fuel pump 26 may be fixedly installed to the pump support 34 by bolting. However, since the fuel pump 26 needs to be detachable for maintenance, the fuel pump 26 and the pump support 34 may be connected using a detachable fastening method (e.g., bolting).

The pump support 34 may be provided with a reinforcement portion 341 to stably support the fuel pump 26. In this case, the reinforcing portion 341 may be provided side by side with the load direction of the fuel pump 26 in the vicinity of the fuel pump 26, and for example, it may be provided vertically. Accordingly, since sagging of the pump support 34 due to the load of the fuel pump 26 is prevented, it is possible to stably support the fuel pump 26 at a position above the bottom of the wall 10.

In addition, the lower rotary bearing portion 30 of an example embodiment may further include a level gauge support 35. As described above, the pump tower 20 may be provided with a level gauging pipe configured to measure a liquefied gas level (liquid level) of the storage space, and the level gauge support 35 may be configured to support the level gauging pipe and provided to be fixed onto the wall 10 through the fixed portion 31 after passing through the extended portion 33.

However, like other pipes, the height of the level gauging pipe may also vary by being contracted/expanded due to cryogenic liquefied gas. For preparation therefor, a lower end of the level gauging pipe may be fixed by the level gauge support 35, and a structure (such as a bellows structure or a telescopic structure) that allows contraction/expansion in at least a portion in the vertical direction may be applied.

Alternatively, the level gauging pipe may be provided, similarly to other pipes of the pump tower 20, to have an upper end fixed to the dome 10a with a lower end having only the horizontal movement constrained by the level gauge support 35. In this case, one side of the level gauge support 35 may be provided in the shape of a hollow cylinder that surrounds the lower end of the level gauge pipe.

The level gauge support 35 may be fixed to the extended portion 33 through the pump support 34. In other words, the pump support 34 coupled to the extended portion 33 has one side fixed to the extended portion 33 with respect to a portion surrounding the fuel pump 26, and the level gauge support 35 may be fixed onto the other side displaced from the one side.

Referring to FIG. 12, the right side of the pump support 34 may be connected to the extended portion 33, and the level gauge support 35 may be connected to the upper side of the pump support 34. At this time, the same bolt-fastening method may be applied for the coupling between the pump support 34 and the extended portion 33 and that between the pump support 34 and the level gauge support 35, or welding may be applied for coupling of the pump support 34 and the level gauge support portion 35, unlike that between the pump support 34 and the extended portion 33.

As such, in an example embodiment, the number of pumps may be reduced by implementing stripping/spraying and fuel supply by a single fuel pump 26, and by installing, at one side of the constraining portion 32, the pump support 34 configured to support the fuel pump 26 onto the lower rotary bearing portion 30, it is possible to provide the lower rotary bearing portion 30 having a structure with the simplified structure and the improved durability.

Figure 13:
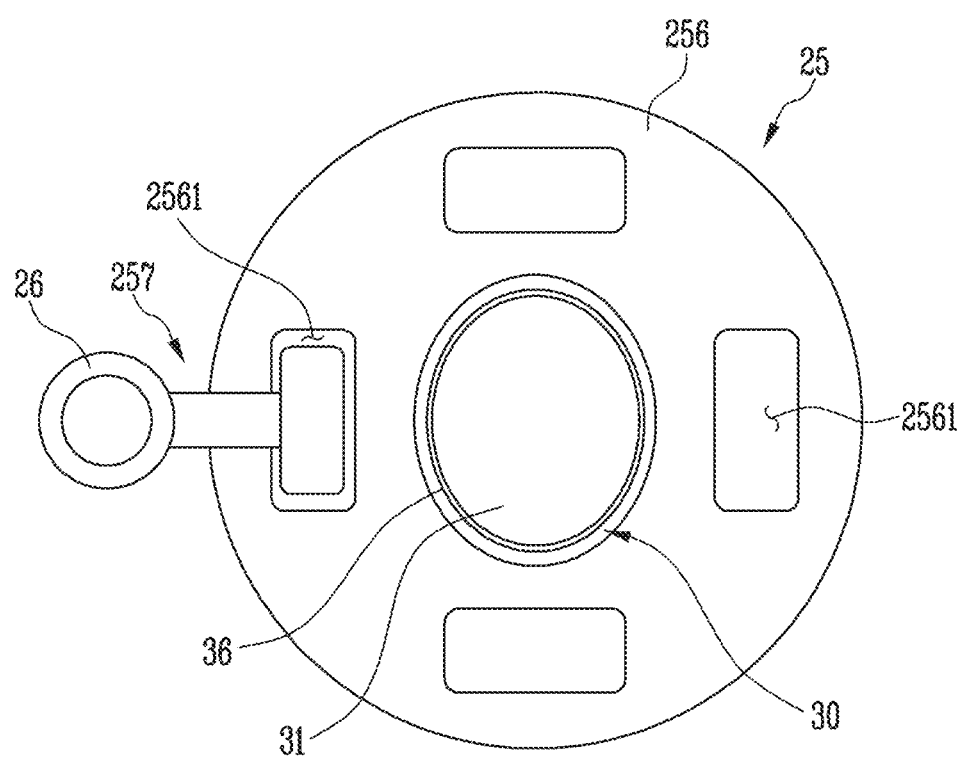
FIG. 13 is a cross-sectional view of a pump tower and a lower rotary bearing portion in accordance with a fourth example embodiment of the present disclosure.

FIG. 13 is a cross-sectional view of the pump tower and the lower rotary bearing portion according to the fourth example embodiment of the present disclosure.

Referring to FIG. 13, the lower rotary bearing portion 30 according to the fourth example embodiment of the present disclosure is similar to the previous example embodiment in that it includes the fixed portion 31 fixed to the wall 10 so as to protrude inward from the wall 10.

However, the lower rotary bearing portion 30 of an example embodiment may restrict the horizontal movement of the lower end of the pump tower 20 only by the fixed portion 31 without a separate constraining portion 32.

To this end, the upper rotary bearing portion 25 at the lower end of the pump tower 20 includes a inlet portion 256 having a hollow shape so that the fixed portion 31 is insertedly seated. Therefore, as the fixed portion 31 is positioned in the inlet portion 256 to make the inner surface of the inlet portion 256 and the outer surface of the fixed portion 31 face each other, the reciprocal horizontal movement of the fixed portion 31 and the inlet portion 256 may be constrained by a double tube structure.

At this time, the fixed portion 31 of the lower rotary bearing portion 30 may be applied with a slidable surface such as a sliding pad 36 so as to allow the vertical movement of the upper rotary bearing portion 25 on an outer surface facing the inner surface of the inlet portion 256.

However, when the inlet portion 256 and the fixed portion 31 are provided in a circular shape, the rotational movement of the pump tower 20 may be allowed, such that the fixed portion 31 or the inlet portion 256 in an example embodiment may be provided to have anon-circular cross section. Therefore, the horizontal movement (translation and rotation) of the upper rotary bearing portion 25 may be sufficiently constrained based on the lower rotary bearing portion 30

In this case, the non-circular cross section may refer to an elliptical or polygonal shape, or a plurality of circular cross sections may also correspond to the non-circular cross section referred in the present specification.

Alternatively, the vertical center of the fixed portion 31 is provided to be displaced from the vertical center of the pump tower 20, thereby suppressing the rotation of the lower end of the pump tower 20 through the inlet portion 256 and the fixed portion 31. In this case, even when the pump tower 20 rotates, the centers of the fixed portion 31 and the inlet portion 256 are displaced from the rotation center of the pump tower 20, so that the inlet portion 256 and the fixed portion 31 may suppress the rotation of the pump tower 20 even when having a circular cross section.

The inlet portion 256 may be provided in a porous form having one or more through holes 2561 on the periphery of an inner surface facing the upper rotary bearing portion 25. Thereby, the weight of the upper rotary bearing portion 25 may be reduced.

In addition, the inlet portion 256 may be provided with a pump support 257 configured to support the discharge pump 24 or the fuel pump 26 on one side. The pump support 257 may be insertedly installed in any one of the through holes 2561 provided in the inlet portion 256.

Since the discharge pump 24 has a configuration fixed to the unloading pipe 21, when the pump support 257 supports the discharge pump 24, the pump support 257 may be firmly fixedly installed to the inlet portion 256.

On the other hand, the fuel pump 26 in an example embodiment may be a complex pump configured to implement functions such as stripping as described in the previous example embodiment and has a configuration fixed to the wall 10 (through the lower rotary bearing portion 30), such that, when the pump support 257 supports the fuel pump 26, the pump support 257 may be provided to have the horizontal movement constrained while vertical sliding is allowed in the through hole 2561.

As such, in an example embodiment, the lower rotary bearing portion 30 and the upper rotary bearing portion 25 are inserted in a double tube structure so that vertical movement is allowed like a telescopic structure while horizontal movement is constrained, but rotational movement may be stably restricted by a non-circular cross section or a misalignment of the vertical center.

Of course, the present disclosure may include a combination of at least any one or more example embodiments and techniques known to those skilled in the art, or a combination of at least two or more embodiments, as additional example embodiments, in addition to the example embodiments described above.

Although the present disclosure has been described in detail through specific example embodiments, it is intended to describe the present disclosure in detail, the present disclosure is not limited thereto, and it will be clear that the modification or improvement thereof is possible by those of ordinary skill in the art within the technical spirit of the present disclosure.

All simple modifications or changes of the present disclosure fall within the scope of the present disclosure, and the specific scope of protection of the present disclosure will become clear by the appended claims.

The invention claimed is:

1. A liquefied gas storage tank comprising:
a wall configured to form a storage space for accommodating liquefied gas and having a dome formed on its upper surface for inflow and outflow of the liquefied gas;
a pump tower having an upper end fixed to the dome and provided with a pipe configured to load and unload liquefied gas and a discharge pump configured to unload liquefied gas; and
a lower rotary bearing portion provided on the wall forming a bottom of the storage space and configured to constrain a lower end of the pump tower,
wherein
the pump tower comprises an upper rotary bearing portion which is guided to have horizontal movement constrained while vertical movement is allowed by the lower rotary bearing portion, and
the lower rotary bearing portion comprises a fixed portion fixed to the wall to protrude inward from the wall and having a circular cross section, and a plurality of constraining portions which are radially disposed based on a vertical center and around the fixed portion, and provided side by side with the vertical center to have a plurality of constraining surfaces, respectively, so that the upper rotary bearing portion is seated among the plurality of constraining portions.

2. The liquefied gas storage tank of claim 1, wherein the constraining portion has an arc shape to connect a pair of the constraining surfaces that are spaced apart at a predetermined angle.

3. The liquefied gas storage tank of claim 1, wherein the constraining portion is provided point-symmetrically based on the vertical center.

4. A liquefied gas storage tank comprising:
a wall configured to form a storage space for accommodating liquefied gas and having a dome formed on its upper surface for inflow and outflow of liquefied gas;
a pump tower having an upper end fixed to the dome and provided with a pipe configured to load and unload the liquefied gas and a discharge pump configured to unload liquefied gas; and a lower rotary bearing portion provided on the wall forming a bottom of the storage space and configured to constrain a lower end of the pump tower, wherein the pump tower comprises an upper rotary bearing portion which is guided to have horizontal movement constrained while vertical movement is allowed by the lower rotary bearing portion, the lower rotary bearing portion comprises a fixed portion fixed to the wall to protrude inward from the wall and having a circular cross section, and a plurality of constraining portions which are radially disposed based on a vertical center and around the fixed portion, and provided side by side with the vertical center to constrain the upper rotary bearing portion, and the upper rotary bearing portion comprises a plurality of seating portions protruding downward of the pump tower so as to be inserted among the plurality of constraining surfaces and having a seating surface facing the constraining surface, and a reinforcing portion configured to connect the plurality of seating portions having the seating surfaces at each different angle.

5. The liquefied gas storage tank of claim 4, wherein the seating portion comprises:
a protrusion vertically protruding downward of the pump tower; and
a reinforcing rib provided at an upper end of the protrusion,
wherein the seating surface is provided perpendicular to the protrusion to form a T-shape with the protrusion.

6. The liquefied gas storage tank of claim 5, wherein the seating portion further comprises a reinforcing plate which is provided parallel to the protrusion and in which the seating surface is installed.

7. The liquefied gas storage tank of claim 4, wherein the reinforcing portion is provided to connect the plurality of seating portions that are spaced apart to have a 90 degree angle.

8. The liquefied gas storage tank of claim 4, wherein the reinforcing portion has a shape provided to be curved or bent at least once in order to connect the plurality of seating portions disposed at each different angle.

9. The liquefied gas storage tank of claim 4, wherein the seating portion is provided point-symmetrically based on the vertical center.

10. A liquefied gas storage tank comprising:
a wall configured to form a storage space for accommodating liquefied gas and having a dome formed on its upper surface for inflow and outflow of liquefied gas;
a pump tower having an upper end fixed to the dome and provided with a pipe configured to load and unload the liquefied gas and a discharge pump configured to unload the liquefied gas; and
a lower rotary bearing portion provided on the wall forming a bottom of the storage space, configured to constrain a lower end of the pump tower, and provided with a fuel pump configured to supply the liquefied gas to an engine,
wherein the lower rotary bearing portion comprises:
a constraining portion having a plurality of constraining surfaces which are radially disposed based on a vertical center and provided side by side with the vertical center to constrain a lower end of the pump tower;
an extended portion extended in a direction away from the vertical center from the constraining portion; and
a pump support fixed to the extended portion and configured to support the fuel pump.

11. The liquefied gas storage tank of claim 10, wherein a plurality of the constraining portions are provided to be radially disposed based on the vertical center, and
the extended portion is provided to extend from any one of the constraining portions.

12. The liquefied gas storage tank of claim 10, wherein at least a portion of the pump support has a U-shape surrounding the fuel pump, and a reinforcing portion is provided around the fuel pump side by side with a load direction of the fuel pump.

13. The liquefied gas storage tank of claim 10, wherein the lower rotary bearing portion further comprises a level gauge support configured to support a level gauging pipe which is configured to measure a level of the liquefied gas in the storage space, and
the pump support has one side fixed to the extended portion based on a portion surrounding the fuel pump while the level gauge support is fixed to the other side displaced from the one side.

14. The liquefied gas storage tank of claim 10, wherein the fuel pump implements, in addition to a function of supplying the liquefied gas stored in the storage space to the engine, a stripping function to discharge liquefied gas remaining in the storage space to the outside or a spraying function to circulate liquefied gas on the bottom of the storage space to an upper portion of the storage space in a complex way.

15. A ship comprising the liquefied gas storage tank of claim 1.

16. A ship comprising the liquefied gas storage tank of claim 4.

* * * * *